United States Patent [19]
Ellis et al.

[11] Patent Number: 5,938,047
[45] Date of Patent: Aug. 17, 1999

[54] MATERIAL STORAGE AND RETRIEVAL ASSEMBLY

[76] Inventors: Chris Ellis; Bill Schnittker, both of 520 S. Holland, Suite 501, Wichita, Kans. 67209

[21] Appl. No.: 09/049,956

[22] Filed: Mar. 27, 1998

[51] Int. Cl.⁶ ..................................................... A47F 5/00
[52] U.S. Cl. ..................... 211/1.57; 211/162; 211/193; 211/207; 312/201; 414/277; 414/281; 414/331
[58] Field of Search .................................. 211/1.57, 162, 211/175, 207, 193, 60.1; 414/277, 281, 331; 312/198, 201

[56] References Cited

U.S. PATENT DOCUMENTS

| | | | |
|---|---|---|---|
| 1,051,452 | 1/1913 | Rock | 211/193 X |
| 1,698,974 | 1/1929 | Vance | 211/193 X |
| 2,812,069 | 11/1957 | Trammell | 211/162 |
| 3,977,542 | 8/1976 | Stolzer | 214/730 X |
| 4,329,928 | 5/1982 | Shaw | 211/1.57 X |
| 4,372,724 | 2/1983 | Stolzer | 414/281 |
| 4,787,804 | 11/1988 | Edenas | 414/281 |
| 4,838,749 | 6/1989 | Potocinak | 414/277 |
| 4,941,578 | 7/1990 | Devening | 211/162 X |
| 5,281,070 | 1/1994 | Stolzer | 414/281 |
| 5,354,169 | 10/1994 | Washio et al. | 414/281 X |

Primary Examiner—Robert W. Gibson, Jr.
Attorney, Agent, or Firm—Kenneth Jack

[57] ABSTRACT

An assembly for storage and retrieval of materials consisting of a right gantry carrying track, a left gantry carrying track in parallel alignment with the right gantry carrying track, a right column, a left column, right column mounting means rollably mounting the right column upon the right gantry carrying track, left column mounting means rollably mounting the left column upon the left gantry carrying track, a lift beam having cantilevered lift arms fixedly attached thereto, lift beam mounting means mounting the lift beam upon the left and right columns so that the lift beam may be upwardly and downwardly moved, storage rack carrying tracks positioned between the gantry carrying tracks in parallel alignment, storage racks, and storage rack mounting means rollably mounting the storage racks upon the storage rack carrying tracks.

20 Claims, 6 Drawing Sheets

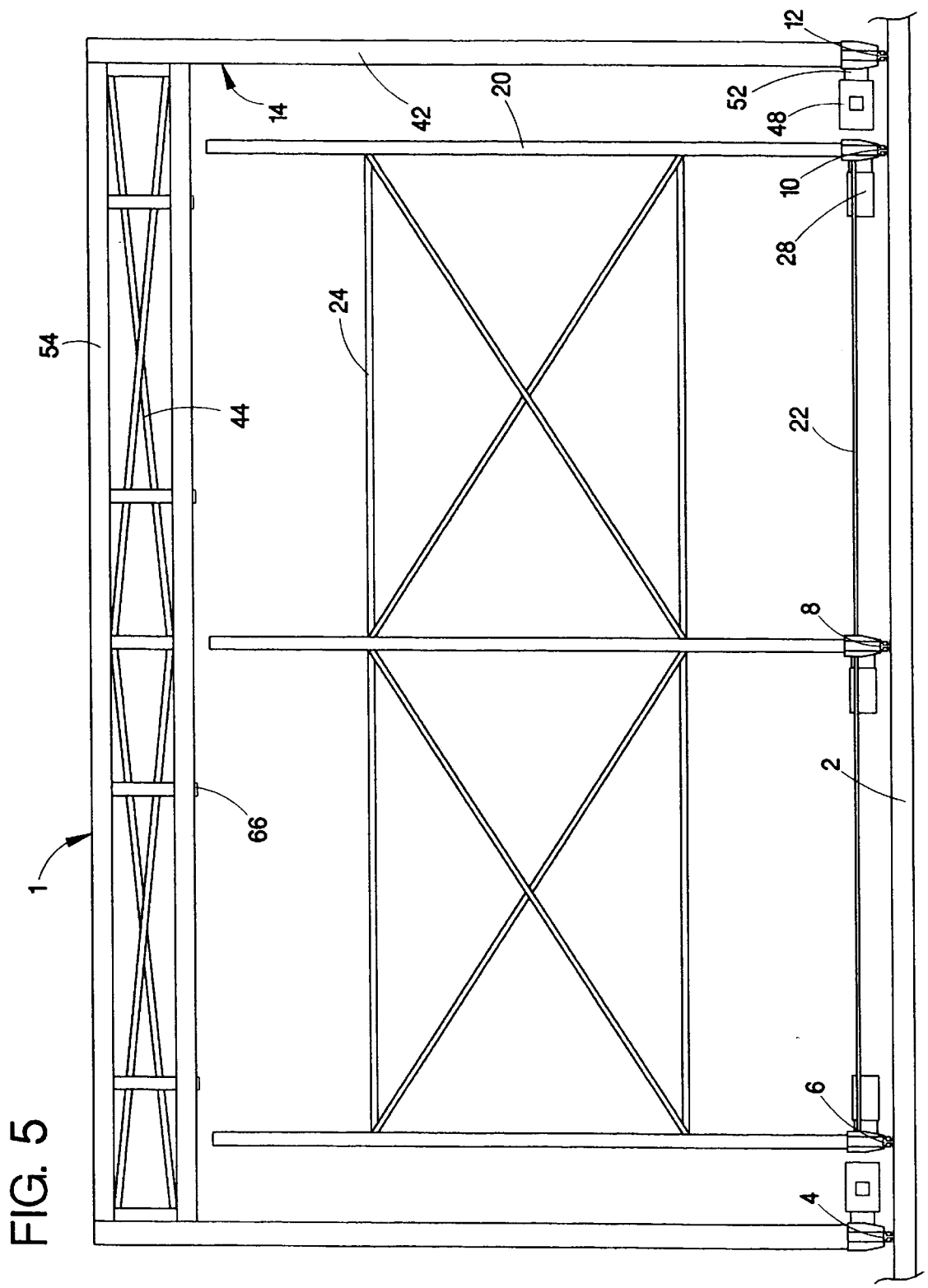

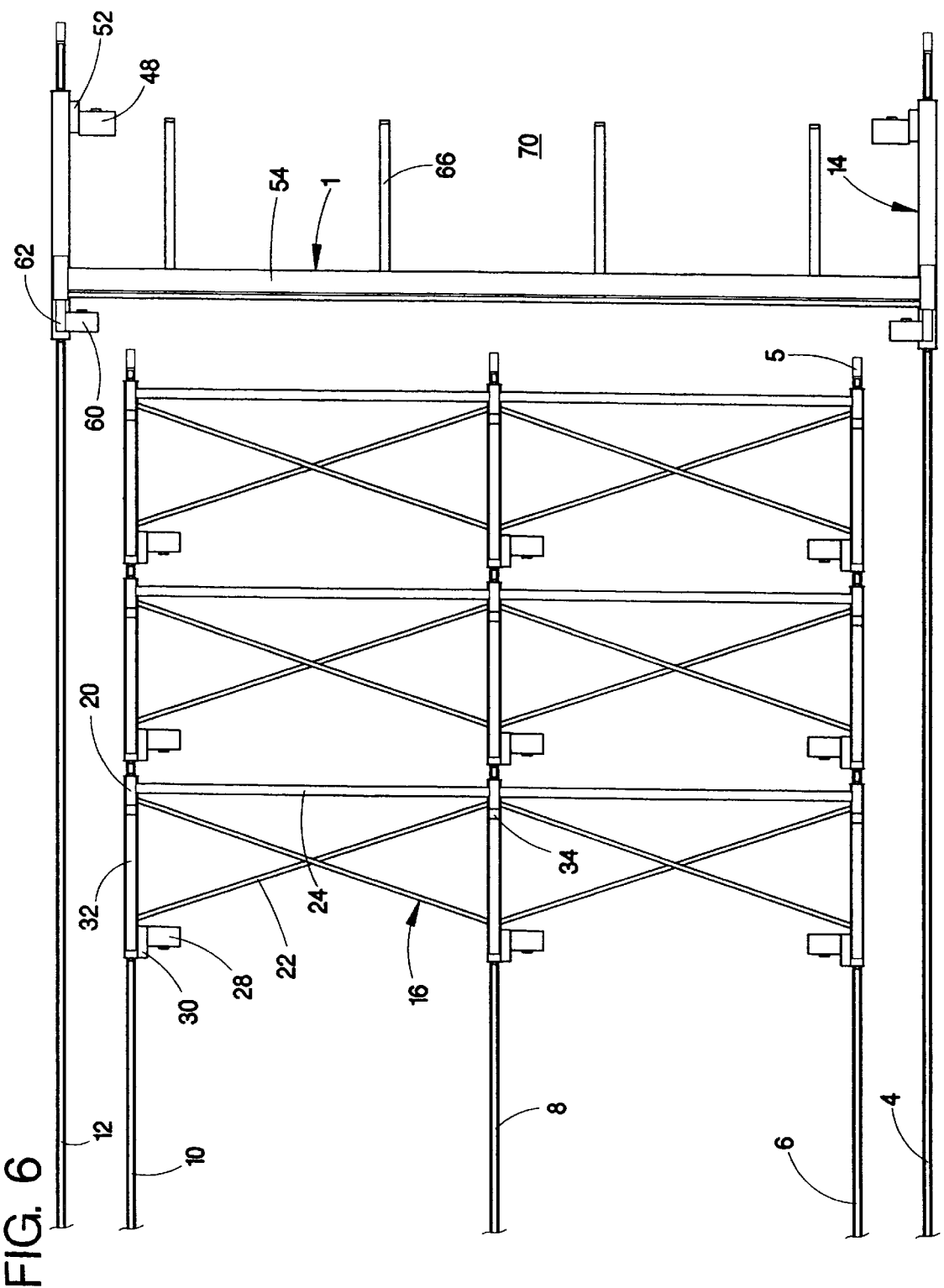

MATERIAL STORAGE AND RETRIEVAL ASSEMBLY

FIELD OF THE INVENTION

This invention relates to mechanisms, machines, or assemblies facilitating efficient storage and retrieval of materials. More particularly, this invention relates to such mechanisms adapted for storage and retrieval of materials which are capable of being lifted and transported by the cantilevered material handling arms of a forklift mechanism.

BACKGROUND OF THE INVENTION

U.S. Pat. No. 5,354,169 issued Oct. 11, 1994, to Washio, et al., discloses a gantry crane which is rollably mounted upon parallel tracks for longitudinal transport. In Washio, sessile cantilevered storage racks are erected between the gantry carrying tracks, such racks being utilizable for storage of long stock materials such as timbers and pipes. In operation of the assembly disclosed in Washio, et al., its gantry crane straddles and overrides the cantilevered storage racks. A crossbeam which horizontally supports and extends cantilevered material handling arms, similar to those of a common forklift, is suspended by cables from the upper structural cross member of the gantry; the cables providing alternate upward and downward motion of the crossbeam through the action of a winch. Through rolling motion of the gantry crane in Washio, and through operation of its fork bearing crossbeam, materials stored in the cantilevered storage racks may be alternately stored and removed. The storage system disclosed in Washio results in undesirable waste of useful storage space, requiring a series of permanent aisles between the cantilevered storage racks for operation of the gantry crane. The instant inventive storage assembly solves such space utilization problem by combining a rollable gantry lift with mechanisms and means for packable and separateable storage racks, eliminating the space wasting series of aisles.

PRIOR ART PATENTS

U.S. Pat. No. 5,354,169 issued Oct. 11, 1994, to Washio, et al., discloses a storage system utilizing a rolling gantry lift.

U.S. Pat. No. RE.35,555 issued Jul. 8, 1997, to Sjorgren, et al., discloses a bundling and storage apparatus utilizing storage racks rollable along tracks.

U.S. Pat. No. 5,281,070 issued Jan. 25, 1994, to Stolzer discloses a shelf service apparatus utilizing a gantry crane.

U.S. Pat. No. 5,007,785 issued Apr. 16, 1991, to Van Der Schoot discloses an infinitely positionable forklift for manipulation and storage of materials stored upon rollable storage racks.

U.S. Pat. No. 3,865,446 issued Feb. 11, 1975, to Mastronardi discloses storage racks such as bookcases which are stackable face to face and which are rollable along tracks.

U.S. Pat. No. 5,395,200 issued Mar. 7, 1995, to Meier discloses a gantry crane apparatus for application to an array of storage racks.

U.S. Pat. No. 4,378,072 issued Mar. 29, 1983, to Appleman, et al., discloses a rollable gantry crane.

U.S. Pat. No. 5,588,790 issued Dec. 31, 1996, to Lichti discloses a high speed storage system utilizing rollable racks.

U.S. Pat. No. 5,096,357 issued Mar. 17, 1992, to Galbani discloses an apparatus for removing yarn bobbins and depositing upon rollable trolleys.

U.S. Pat. No. 5,312,221 issued May 17, 1994, to Furukawa, et al., discloses a pile board inserting method and machine.

None of the above disclosed patents teach, disclose or describe the novel, inventive, useful, and unique aspects, elements and features of the present inventive material storage and retrieval assembly.

BRIEF SUMMARY OF THE INVENTION

In a preferred embodiment of the present inventive assembly for storage and retrieval of materials, a flat level ground surface or concrete warehouse floor surface is utilized for support and installation of five parallel T-rail tracks. Where the T-rail tracks are installed upon the ground, it is preferable to prepare concrete footings which underlie and support of the T-rail tracks. Flat flanged bases of the T-rail tracks preferably are anchored to the underlying concrete support by threaded steel lugs extending upward from the concrete surface. The five T-rail tracks are installed in parallel alignment, with the three inner T-rail tracks serving as storage rack carrying tracks, and the two outer T-rail tracks serving as gantry carrying tracks. Preferably, the ends of the two gantry carrying tracks extend beyond the ends of the three storage rack carrying tracks creating material loading and unloading zones at both ends of the tracks. Roll stops are fixedly mounted at the ends of each of the gantry carrying tracks and at the ends of each of the storage rack carrying tracks, the roll stops preventing assemblies rollably mounted upon the tracks from rolling off of the ends of said tracks.

A series of "stackable" storage racks are rollably mounted upon the three storage rack carrying tracks. Where such racks are utilized for storage of long materials such as pipes or timbers, each storage rack preferably comprises three vertical support columns, each such column extending upward from a support base, each vertical support columns and its base forming an "L" configuration. The vertical support columns and bases of each storage rack are interconnected by a web of crossbeams and triangulating braces forming rigid unitary structures. Each vertical support column preferably has a series of cantilevered material supporting arms fixedly attached thereto and extending horizontally therefrom in the same direction as the storage rack's base. Preferably, the elevations of the vertical support arms extending from the three vertical support columns are coincidental, providing for level storage of materials overlying the upper surfaces of such arms.

The base of each storage rack preferably provides structural support for rotatably mounting of double flanged wheels, for mounting of electric drive motors and for mounting of wheel brakes. Preferably, each support base has a forward and a rear wheel, each forward wheel being powered by a variable frequency electric motor. Preferably, the drive linkages between the electric motors and the forward wheels of the storage racks are reduction gear trains housed within gear boxes. Through selective remote electronic actuation of the electric motors, the series of storage racks may be rolled along the storage rack carrying tracks to stack closely together for storage space economy; and alternately, to separate, selectively creating aisles for access to particular storage racks. The number of storage racks which may be rollably mounted in series upon the storage rack carrying tracks is, as a practical matter, limited only the length of the tracks. For example, storage racks numbered one through ten may be rollably mounted in a series upon the storage rack carrying tracks. In the event, for example, of needed access to storage rack no. six, the electric motors of storage racks nos. one through five may be remotely operated to roll those racks away from storage rack no. six. Alternately, storage racks numbered 6–10 may have their electric motors remotely operated to roll them away from storage rack number five. Either operation opens an aisle in front of storage rack no. six for access to material stored upon its cantilevered material supporting arms.

For efficient loading and unloading of materials onto the arms of the storage racks rollably mounted upon the storage rack carrying tracks, a gantry is rollably mounted upon the gantry carrying tracks, the gantry being of a size enabling it to straddle and roll over the storage racks. A preferred embodiment of the gantry provides a pair of vertical support columns, each column being supported to extend perpendicularly upward from the gantry carrying tracks by an elongated base. Preferably, the two elongated bases of the gantry extend in a direction opposite that of the support bases of the storage racks, forming similar "L" configurations. Double flanged wheels are rotatably mounted upon the forward and rearward ends of the support bases of the gantry, with the forward wheels being powered by variable frequency electric motors. Preferably, reduction gear drive trains are utilized for power transmission from the drive axles of such motors to such wheels. As in the bases of the storage racks, disc brakes are applied to the gantry wheels.

The upper ends of the two vertical support columns of the gantry are rigidly interconnected by a truss, causing the vertical support columns, in combination with the truss, to form a rigid unitary structure while its double flanged wheels rest upon the T-rail gantry carrying tracks. A moveable lift beam also spans between the two vertical support columns, the gantry having mounted within the vertical support columns and upon the ends of the lift beam, apparatus allowing the lift beam to be selectively raised and lowered along the vertical lengths of the vertical support columns.

Preferably, slidable motion of the lift beam with respect to the vertical support columns is facilitated by "T" flanges extending outwardly from the ends of the lift beam, the "T" flanges slidably engaging vertical slide slots extending along the inwardly facing walls of the vertical support columns. Powered upward and downward movement of the lift beam preferably is provided by spirally threaded shafts rotatably mounted within hollow interior spaces within the vertical support columns, the spirally threaded shafts extending along the full vertical lengths of the vertical support columns. The spirally threaded shafts preferably are positioned within the columns so that they may threadedly engage ball screw nuts which are fixedly attached to the opposing ends of the lift beam, and which extend into the hollow interior spaces of the vertical support columns. Powered rotations of the threaded shafts engage the ball screw nuts, transferring lifting or lowering forces to the lift beam. Such powered rotation preferably is provided by variable frequency electric motors fixedly mounted at the upper ends of the vertical support columns. Rotational torque is preferably transferred from such motors to the upper ends of the spirally threaded shafts by reduction gear trains. Remote operation of the electric motors mounted upon the vertical support columns of the gantry allow its lift beam to be selectively positioned at any elevation along the lengths of the vertical support columns.

In order to enable the lift beam to perform its material lifting function, cantilevered material lifting arms preferably are fixedly attached to the lift beam so that such arms horizontally extend therefrom in the same direction of extension of the gantry's support bases. Preferably, the material lifting arms are positioned along the lift beam so that upon their extension into the material storing spaces of the storage racks, the material lifting arms will not underlie or overlie any of the storage rack's material storing arms. Offset alignments of the material lifting arms with respect to the material storing arms allow the gantry lift to rollably move materials such as long timbers or long pipes into a storage space of a storage rack, and to lower such material until the material contacts the upper surface of the storage rack's material storing arms, transferring the material from the gantry to the storage rack for storage. Through a reversal of such operation steps, material may be removed from the storage racks and raised to an elevation above the upper surfaces of the storage racks. Material so raised by the gantry may be rollably moved along the gantry carrying tracks over the storage racks for unloading at the end of the tracks. Through alternate operation, and through selective creation of aisles between storage racks, material to be stored may be raised from positions at loading zones at the ends of the tracks, upward and over the storage racks, for storage within any desired storage racks.

Accordingly, it is an object of the present invention to provide an assembly for storage and retrieval of materials providing for rollable and stackable storage racks assembled in combination with an over-rolling gantry lift for efficient storage space usage, and for efficient loading and unloading of materials.

Other and further objects, benefits, and advantages of the present inventive assembly for storage and retrieval of materials will become known to those skilled in the art upon review of the detailed descriptions which follow, and upon review of the appended drawings.

BRIEF DESCRIPTION OF THE DRAWINGS

FIG. 5 is an end view of the material storage and retrieval assembly.

FIG. 6 is a plan view of the material storage and retrieval assembly.

DETAILED DESCRIPTION OF THE PREFERRED EMBODIMENT

Figure 1:
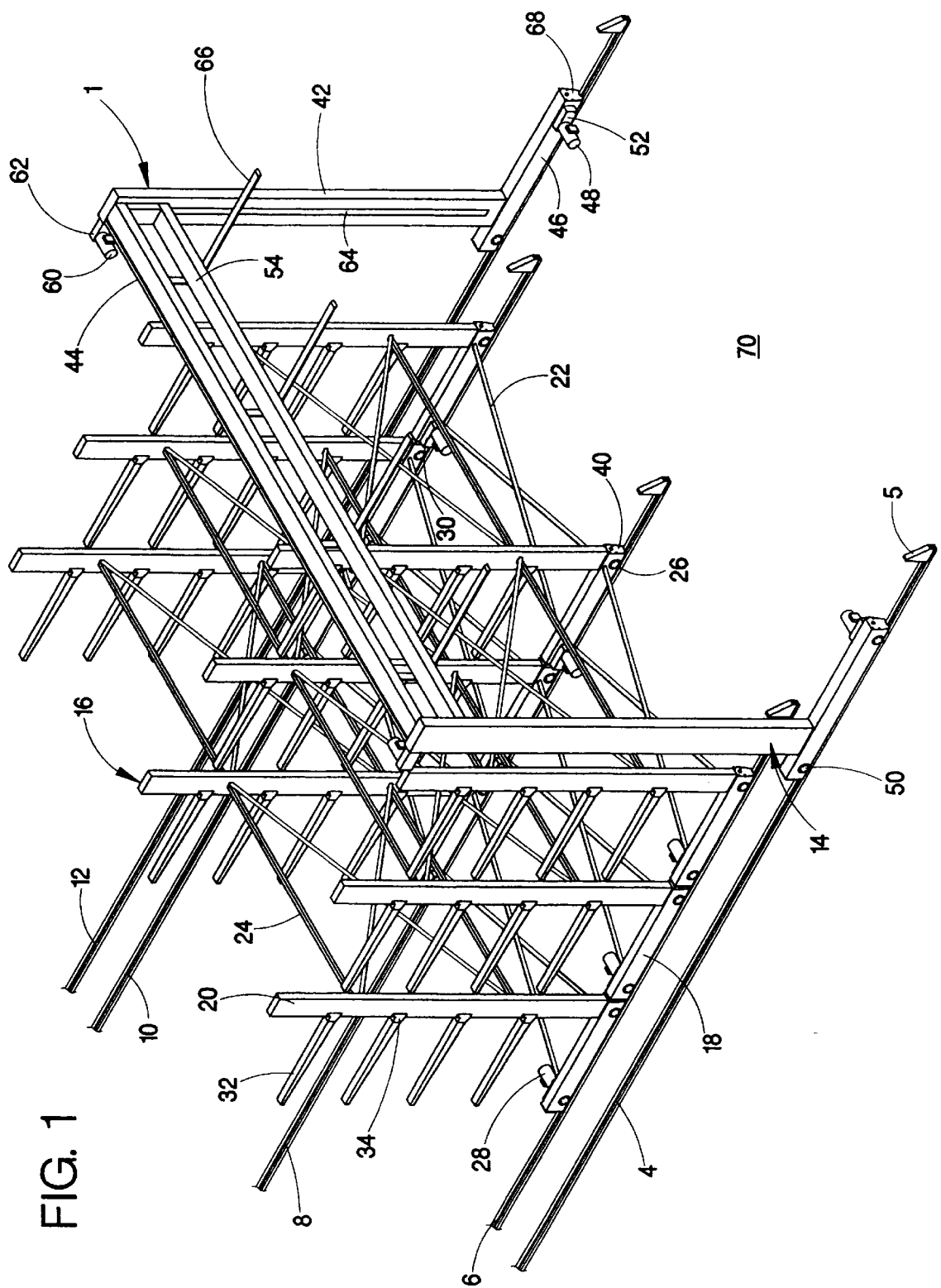
FIG. 1 is an isometric view of the assembly for storage and retrieval of materials.

Referring now to the drawings, and in particular to Drawing FIG. 5, the material storage and retrieval assembly, referred to generally by Drawing Element 1, is preferably erected upon a flat level surface such as a concrete floor 2 of a warehouse. Referring simultaneously to FIGS. 5 and 6, a series of five parallel T-rail tracks 4, 6, 8, 10, and 12 are fixedly mounted upon the concrete floor surface 2. Preferably, threaded lugs extend upward from the concrete surface for mounting of the Trail tracks 4, 6, 8, 10, and 12 by means of threaded nuts and pressure plates. T-rails 4 and 12 rollably support a gantry which is referred to generally by Drawing Element 14, and T-rails 6, 8, and 10 rollably support a series of storage racks, which series is referred to generally singularly and as a group by Drawing Element 16. Rolls stops are preferably fixedly attached to the ends of each of the T-rail tracks 4, 6, 8, 10, and 12.

Figure 3:
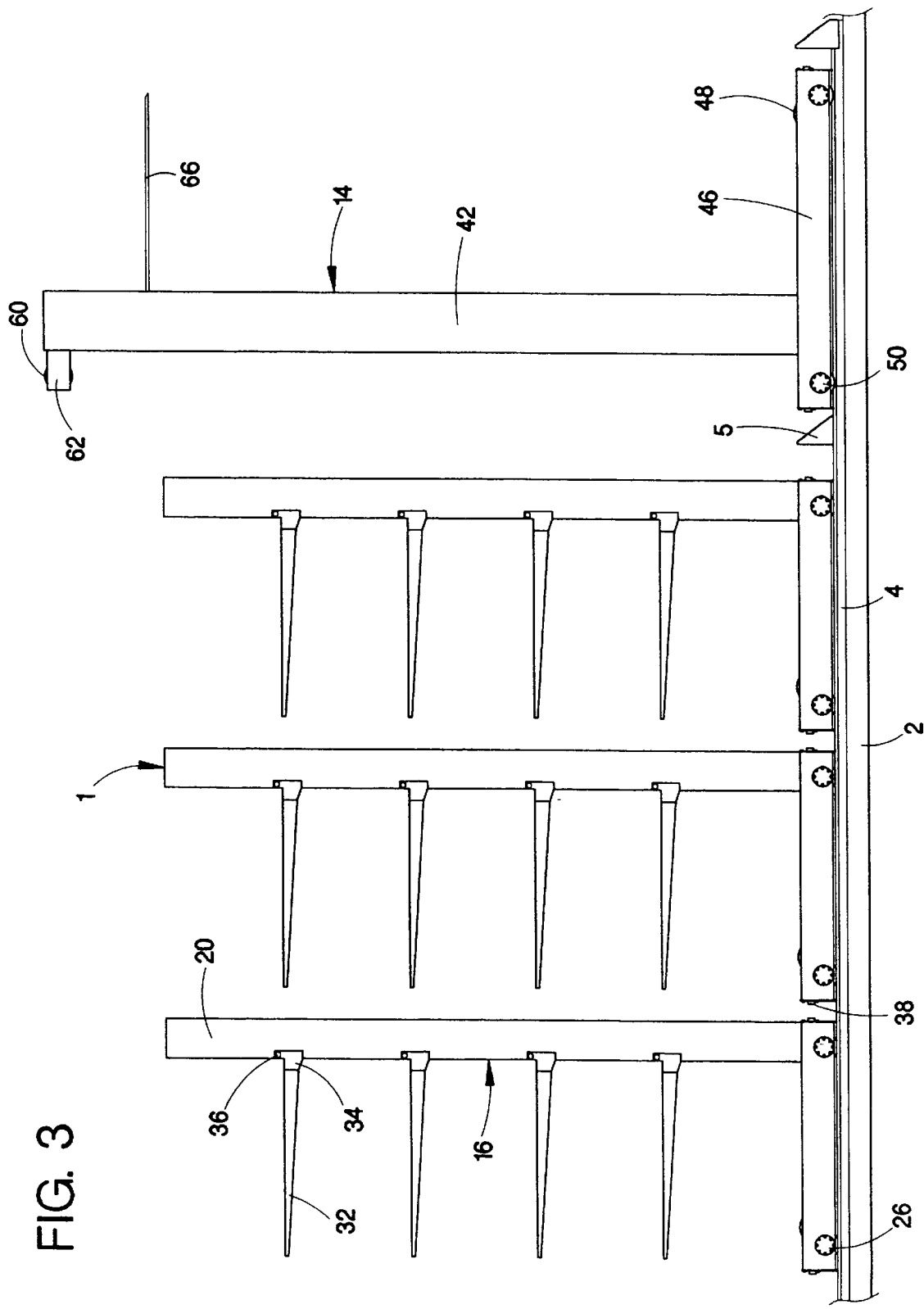
FIG. 3 is a side view of the material storage and retrieval assembly.

Referring simultaneously to Drawing FIGS. 3 and 6, each storage rack 16 preferably has three support bases 18, each support base 18 having a vertical column 20 extending vertically upward therefrom. Referring to FIG. 6, cross-bracing beams 22 rigidly interconnect the support bases 18 of the storage racks 16 and, referring to FIG. 5, cross-bracing beams 24 rigidly interconnect each storage rack's vertical columns 20. The cross-bracing beams 22 and 20 of the storage racks 16 incorporate the support bases 18 and the vertical columns into rigid unitary structures.

Figure 4:
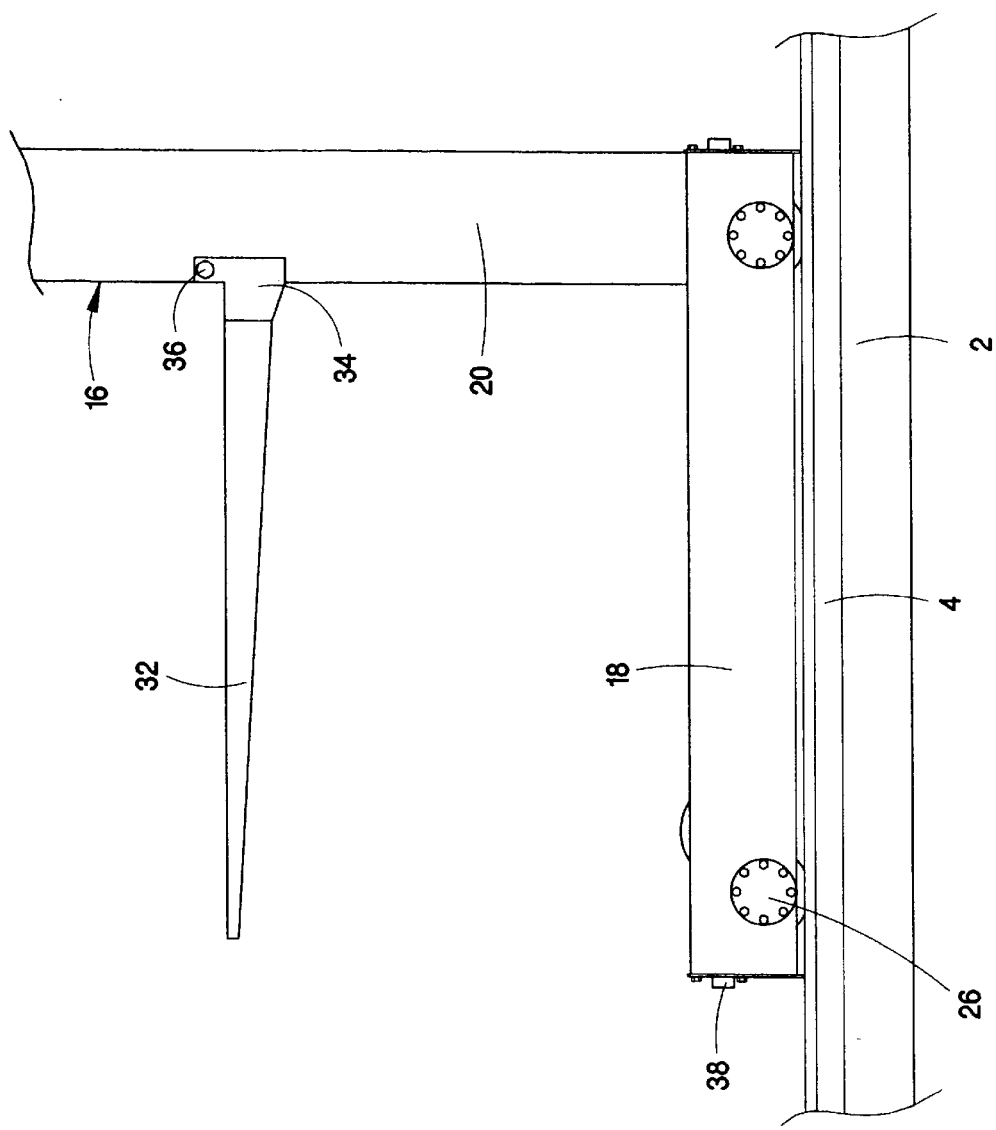
FIG. 4 is a magnified detail of FIG. 3.

Referring simultaneously to FIGS. 4 and 6, each storage rack 16 is rollably mounted upon T-rail tracks 6, 8, and 10 by means of double flanged wheels 26 which are rotatably mounted within the support bases 18, the inside and outside flanges of the double flanged wheels 26 being fitted for closely engaging the sidewalls of the T-rail tracks 6, 8, and 10. Referring simultaneously to FIGS. 5 and 6, the forward wheels of each storage rack 16 is powered by a variable frequency electric motor 28, the motors 28 transmitting power to the forward wheels by means of reduction gear trains housed within gear boxes 30. Also housed within the support bases 18 of the storage racks 16 are disc brakes, not shown, such brakes engaging the rear wheels.

Referring to FIG. 3, each of the storage rack 16 has a vertically extending series of cantilevered material storing arms 32, each such arm being attached to a vertical support column 20. Referring to FIG. 4, each cantilevered material storing arm 32 preferably is pivotally attached to a vertical support column 20 by means of a cantilevering bracket 34, such brackets being hung from the vertical support column 20 by means of swivel pins 36. Utilization of upwardly swiveling cantilever brackets 34 allow material to be securely stored upon the upper surfaces of the cantilevered material storing arms 32 while allowing such arms to swing upward upon occurrence of a striking force from below. Preferably, each of the cantilevered material storing arms 32, while in their resting positions, extend angularly upward approximately 3° from horizontal, assuring that rolling stock tends to roll into rather than out of the rack. Referring simultaneously to FIGS. 3 and 4, contact points between the storage racks 16, while such racks are stacked front to back, are preferably rubber bumpers 38. Referring to FIG. 1, the rearward and forward ends of each of the support bases 18 of the storage racks 16 support metal track sweeping plates 40, such plates functioning to clear the tracks of debris prior to being over-rolled by the flanged wheels 26.

Referring simultaneously to FIGS. 3 and 6, through remote actuation and operation of the electric motors 28 of the storage racks 16, an access aisle may be created between any two storage racks 16 eliminating the need for permanent aisles between the storage racks and promoting efficient space usage.

Referring to FIG. 5, the gantry 14 has a pair of vertical support columns 42, the upper ends of the vertical support columns 42 being rigidly interconnected by, referring to FIG. 1, a fixed crossbeam 44. At the lower end of each vertical support column 42 is a support base 46, the support bases 46 having mounted thereon variable frequency electric motors 48, double flanged wheels 50, gear boxes 52, and brake assemblies substantially identical to the functional elements mounted upon the support bases 18 of the storage racks 16. Referring to FIG. 1, the forward and rearward ends of each of the support bases 46 of the gantry 14 preferably have track sweeping plates 68 for clearing the gantry carrying tracks 4 and 12 of debris.

Referring to FIG. 1, through remote actuation and operation of the electric motors 48 of the gantry 14, the gantry 14 may be rollably positioned at any point along its gantry carrying tracks 4 and 12, to over-roll the storage racks 16 or to assume a position for operation within any aisle created between any two storage racks 16.

Figure 2:
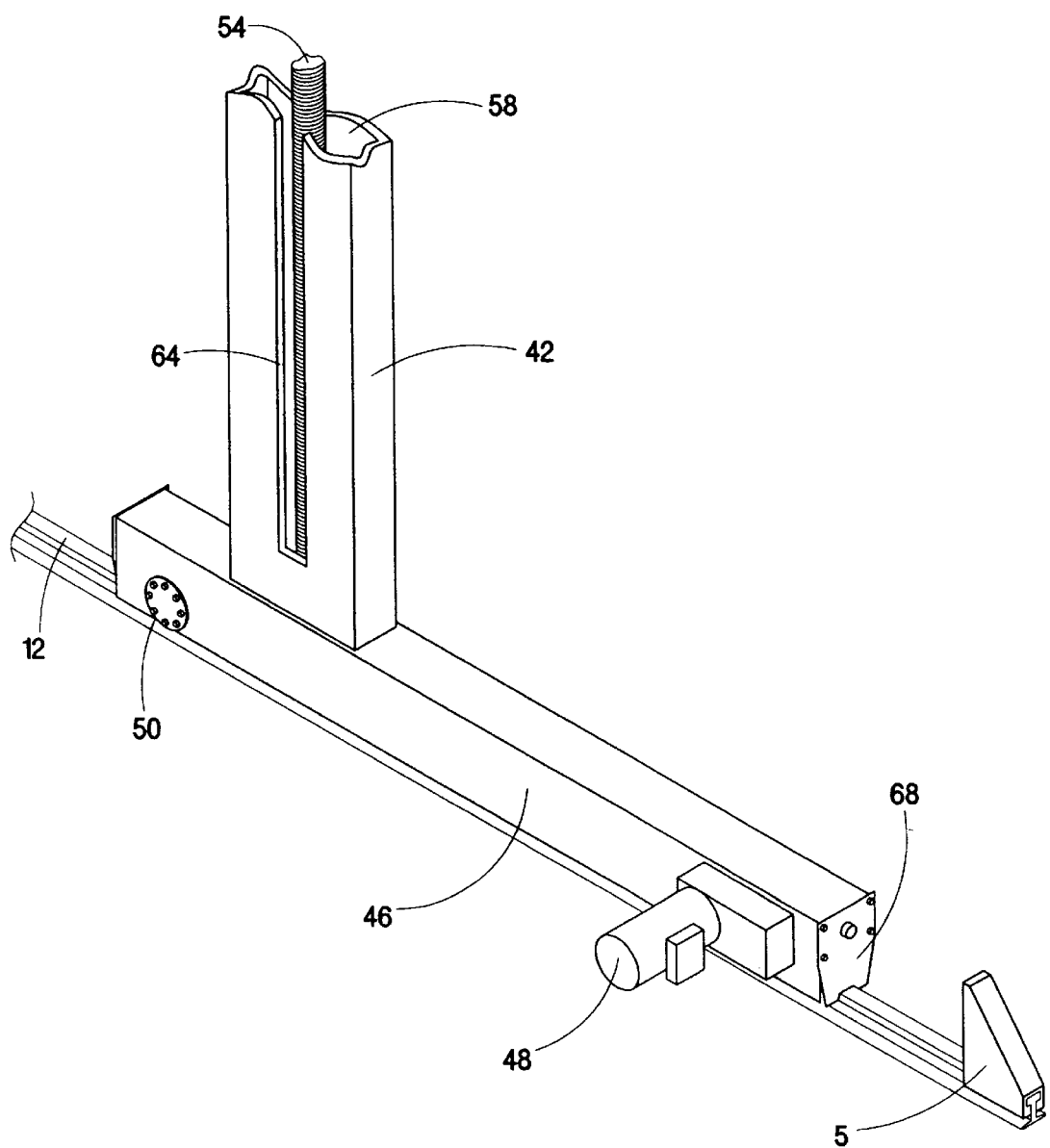
FIG. 2 is a magnified detail of FIG. 1.

Referring to FIG. 1, a lift beam 54 is movably mounted between the vertical support columns 42 so that it may be positioned at any point along the vertical lengths of the vertical support columns 42. Referring to FIG. 2, spirally threaded shafts 56 are rotatably mounted within the hollow interior spaces 58 of each of the vertical support columns 42. Referring to FIG. 1, such spirally threaded shafts are rotatably driven by variable frequency electric motors 60; rotational torque being transmitted from the drive axles of such motors to such spirally threaded shafts by reduction gear trains, not shown, housed within gear boxes 62. A preferable slidable connecting means for interconnecting the ends of the lift beam 54 to the inwardly facing surfaces of the vertical support columns 42 are T-flanges, not shown, extending outwardly from the opposite ends of the lift beam 54. Referring to FIG. 2, such T-flanges are preferably slidably mounted within, slide slots 64 extending vertically along the inner surfaces of each of the vertical support columns 42. Referring to FIG. 1, ball screw nuts, not shown, are preferably fixedly attached to the ends of the lift beam 54 and positioned, referring to FIG. 2, so that they extend through the slide slots 64, into the hollow interior spaces 58 of the vertical support columns 42, for engagement with the spirally threaded shafts 54 mounted therein. Referring simultaneously to FIGS. 1 and 2, lowering and lifting forces resulting from rotation and counter-rotation of the electric motors 60 are transferred to the lift beam 54 through reduction gear trains, not shown, mounted within the gear boxes 62, through the spirally threaded shafts 56, and through the ball screw nuts, not shown.

Referring to FIG. 1, a series of cantilevered material lifting arms 66 are fixedly attached to the lift beam 54. Referring to FIG. 5, such cantilevered material lifting arms 66 are positioned upon the lift beam 54 so that they will not come into contract with, referring to FIG. 3, material storing arms 32.

In operation of the material storage and retrieval assembly 1, long materials to be stored such as pipes or timber, located at the material loading area 70, may be lifted by the material lifting arms 66 of the lift beam 54 and carried upward to an elevation above the upper surfaces of the storage racks 16. Either before or after such operation, the storage racks 16 may be rollably moved through remote actuation of their electric motors 28 to create an access aisle in front of a storage rack 16 which is the desired storage location. Upon creation of such an aisle, the electric motors 48 of the gantry 14 may be remotely actuated to roll the gantry 14 to a position overlying said aisle. The electric motors 60 of the gantry 14 may then be remotely actuated to lower the material to be stored to an elevation matching the elevation of a desired storage location within the desired storage rack 16. The gantry 14 is then remotely actuated to rollably move forward so that the material to be stored moves into the desired storage bin. Electric motors 60 are then actuated to lower the lift beam 54 and the lift arms 66, causing the material to be stored to come to rest upon the cantilevered material storing arms 32 of the desired storage rack 16. A reversal of such operation steps allows material stored within any of the storage racks 16 to be retrieved and placed at the loading and unloading zone 70. In practice, the number of storage rack 16 which may be utilized in the assembly 1 is limited only by the lengths of the T-rail tracks 4, 6, 8, 10, and 12.

While the principles of the invention have been made clear in the above illustrative embodiment, those skilled in the art may make modifications in the structure, arrangement, portions and components of the invention without departing from those principles. Accordingly, it is intended that the description and drawings be interpreted as illustrative and not in the limiting sense, and that the invention be given a scope commensurate with the appended claims.

We claim:

1. An assembly for storage and retrieval of materials upon a substantially flat surface, the assembly comprising:

(a) a right gantry carrying track fixedly mounted upon said surface;

(b) a left gantry carrying track fixedly mounted upon said surface, the left gantry carrying track being in substantial parallel alignment with the right gantry carrying track;

(c) a right column having an upper end and having a lower end;

(d) a left column having an upper end and having a lower end;

(e) right column mounting means capable of rollably mounting the lower end of the right column upon the right gantry carrying track, the right column mounting means mounting the right column upon the right gantry carrying track;

(f) left column mounting means capable of rollably mounting the lower end of the left column upon the left gantry carrying track, the left column mounting means mounting the left column upon the left gantry carrying track;

(g) a lift beam having a right end and having a left end, the lift beam having a plurality of cantilevered lift arms fixedly attached thereto and extending therefrom;

(h) lift beam mounting means capable of mounting the lift beam upon the left and right columns so that the lift beam interconnects and spans between the left and right columns, and so that the lift beam may be alternately upwardly and downwardly moved with respect to the left and right columns, the lift beam mounting means mounting the lift beam upon the left and right columns;

(i) a plurality of storage rack carrying tracks fixedly mounted upon said surface, the storage rack carrying tracks being positioned so that they lie between the left and right gantry carrying tracks, and so that they are in substantial parallel alignment with respect to each other and with respect to the left and right gantry carrying tracks;

(j) a plurality of storage racks, each storage rack being fitted so that it may underlie the lift beam, and so that it may lie between the left and right columns, each storage rack having an upper end and a lower end;

(k) storage rack mounting means capable of rollably mounting the lower ends of the storage racks upon the storage rack carrying tracks, the storage rack mounting means mounting the storage racks upon the storage rack carrying tracks.

2. The assembly of claim No. 1, wherein, the right column mounting means comprises a right gantry column base extending laterally from the lower end of the right column in substantial parallel alignment with the right gantry carrying track, wherein the left column mounting means comprises a left gantry column base extending laterally from the lower end of the left column in substantial parallel alignment with the left gantry carrying track, and wherein the storage rack mounting means comprises a plurality of storage rack supporting bases extending laterally from the lower ends of the storage racks in substantial parallel alignment with the storage rack carrying tracks.

3. The assembly of claim No. 2, wherein the right column mounting means further comprises a plurality of right column wheels rotatably mounted upon the right gantry column base, the right column wheels being fitted for rolling engagement with the right gantry carrying tracks; wherein the left column mounting means further comprises a plurality of left column wheels rotatably mounted upon the left gantry column base, the left column wheels being fitted for rolling engagement with the left gantry carrying track; and wherein the storage rack mounting means further comprises a plurality of storage rack wheels rotatably mounted upon the rack supporting bases, the storage rack wheels being fitted for rolling engagement with the storage rack carrying tracks.

4. The assembly of claim No. 3, wherein the lift beam mounting means comprises a right spirally threaded shaft and a left spirally threaded shaft, the right spirally threaded shaft being vertically and rotatably mounted upon the right column, the left spirally threaded shaft being vertically and rotatably mounted upon the left column; and wherein the lift beam mounting means further comprises left and right spiral thread engaging means respectively fixedly attached to the left and right ends of the lift beam, the left and right spiral thread engaging means being capable, upon rotation of the left and right spirally threaded shafts, of alternately lowering the lift beam and applying a lifting force to the lift beam.

5. The assembly of claim No. 4, wherein the left and right spiral thread engaging means comprise ball screws.

6. The assembly of claim No. 5, further comprising a crossbeam having a right end and having a left end, the right end of the crossbeam being fixedly attached to the upper end of the right column and the left end of the crossbeam being fixedly attached to the upper end of the left column.

7. The assembly of claim No. 6, further comprising left and right lift motors respectively fixedly mounted upon the left and right columns, the left and right lift motors being respectively capable of rotatably driving the left and right spirally threaded shafts for alternately raising and lowering the lift beam.

8. The assembly of claim No. 7, further comprising left and right gantry moving motors respectively fixedly mounted upon the left and right gantry column bases, the left and right gantry moving motors being respectively capable of rotating at least one of the left column wheels and at least one of the right column wheels for powered movement along the left and right gantry carrying tracks.

9. The assembly of claim No. 7, further comprising a plurality of storage rack moving motors fixedly mounted upon the storage rack supporting bases, the storage rack moving motors being capable of rotating a plurality of the storage rack wheels for powered movement of the storage racks along the storage rack carrying tracks.

10. The assembly of claim No. 9, wherein each storage rack comprises at least two vertical support columns, the vertical support columns being interconnected by a plurality of crossbeams, each vertical support column having a plurality of cantilevered material supporting arms fixedly attached thereto and extending outwardly therefrom.

11. The assembly of claim No. 10, wherein the left and right lift motors respectively rotatably drive left and right lift motor drive axles, and wherein left and right lift motor gear trains respectively interconnect the left and right lift motor drive axles and the left and right spirally threaded shafts, the left and right lift motor gear trains being respectively capable of transmitting torque from the left and right lift motor drive axles to the left and right spirally threaded shafts.

12. The assembly of claim No. 11, wherein the left and right gantry moving motors respectively rotatably drive left and right gantry motor drive axles, and wherein left and right gantry motor gear trains respectively interconnect the left and right gantry motor drive axles with at least one left column wheel and with at least one right column wheel, the left and right gantry motor gear trains being respectively capable of transmitting torque from the left and right gantry motor drive axles to the at least one left and the at least one right column wheels.

13. The assembly of claim No. 7, wherein the storage rack moving motors rotatably drive storage rack motor drive axles, and wherein a plurality of storage rack moving gear trains interconnect the storage rack motor drive axles with a plurality of the storage rack wheels, the storage rack moving gear trains being capable of transmitting torque from the storage rack motor drive axles to the plurality of storage rack wheels.

14. The assembly of claim No. 13, wherein the left and right lift motors are electric motors.

15. The assembly of claim No. 14, wherein the left and right gantry moving motors are electric motors.

16. The assembly of claim No. 15, wherein the storage rack moving motors are electric motors.

17. The assembly of claim No. 16, further comprising left and right wheel brakes respectively mounted upon the left and right gantry column bases, the left and right wheel brakes being respectively capable of breaking at least one right column wheel and at least one left column wheel.

18. The assembly of claim No. 17, further comprising a plurality of storage rack wheel brakes mounted upon the storage rack support bases, each storage rack wheel brake being capable of breaking at least one storage rack wheel.

19. The rolling rack and gantry assembly of claim No. 18, wherein the left and right wheel brakes comprise left and right brake calipers and left and right brake rotors.

20. The rolling rack and gantry assembly of claim No. 19, wherein the storage rack wheel brakes comprise brake calipers and brake rotors.

* * * * *